United States Patent [19]

Harada

[11] Patent Number: 5,693,393

[45] Date of Patent: Dec. 2, 1997

[54] MATERIAL FOR RELIEF

[75] Inventor: Takuma Harada, Tokyo, Japan

[73] Assignee: T2 Design Co., Ltd., Japan

[21] Appl. No.: 328,836

[22] Filed: Oct. 25, 1994

[30] Foreign Application Priority Data

Nov. 1, 1993 [JP] Japan .................................. 5-273554

[51] Int. Cl.[6] .................................................. B32B 23/00
[52] U.S. Cl. .......................... 428/40.1; 40/160; 428/41.7; 428/41.8; 428/42.1; 428/43; 428/102; 428/103; 428/158; 428/187; 428/192; 428/195; 428/218; 428/317.3; 428/318.4
[58] Field of Search ........................... 428/40, 158, 187, 428/192, 102, 103, 195, 218, 317.3, 318.4, 40.1, 41.7, 41.8, 42.1, 43; 40/160

[56] References Cited

U.S. PATENT DOCUMENTS

| 2,865,283 | 12/1958 | Stoffer | 156/281 |
| 3,649,331 | 3/1972 | Peterson | 106/122 |
| 4,780,361 | 10/1988 | Schlein | 428/287 |
| 4,986,531 | 1/1991 | Snaper | 428/12 |

*Primary Examiner*—Nasser Ahmad
*Attorney, Agent, or Firm*—Evenson, McKeown, Edwards & Lenahan P.L.L.C.

[57] ABSTRACT

A material for relief has a sheet obtained by heating and compressing a sponge made of a cellulose and a base attached to the back of the sheet. By forming a pattern on the sheet and supplying a water in such a manner as to correspond to the pattern, a raised-portion is formed.

16 Claims, 4 Drawing Sheets

MATERIAL FOR RELIEF

BACKGROUND OF THE INVENTION

The present invention relates to a sheet-like or panel-like material used for relief, and a method for forming relief using this material.

As for conventional material for relief, a board made of gypsum, wood, foamed polystyrol or the like is used, for example. Since the relief is formed by carving those materials, training is required and time is also needed. For this reason, they are not suited to be used as a material for children, for example, to form relief.

Moreover, since the above relief materials are bulky, a large space is required for transportation and storage and the cost is increased.

On the other hand, it is known that a sponge made of a cellulose is used for washing flatware. In some case, this sponge is sold directly as a product, and in other cases, the sponge is heated and compressed into a thin sheet and transported in that state in order to save the transportation cost. Also, the sheet obtained by heating and compressing the sponge of cellulose is sometimes used as a material for medical treatment for absorbing blood, for example. Such sponge made of cellulose is disclosed in a catalog "SPON-TEX". However, it is unknown that the cellulose sponge is used in the field of relief.

SUMMARY OF THE INVENTION

It is, therefore, an object of the present invention to provide a material for relief which is light-weighted and thin, and in which the costs for transportation and storage can be lowered, and a method for forming relief in a simple manner, using this material.

According to one aspect of the present invention, there is provided a material for relief comprising sheet means obtained by heating and compressing a sponge made of a cellulose, the sheet means being expansible by water applied thereto.

According to another aspect of the present invention, there is also provided a method for forming relief comprising the step of providing a pattern on a top-surface of sheet means obtained by heating and compressing a sponge made of a cellulose, and the step of supplying a water to a limited area of the sheet surface corresponding to the pattern to remove the compressed state in the limited area, thereby forming a raised-portion thereon.

DETAILED DESCRIPTION OF THE EMBODIMENTS

Figure 1A:
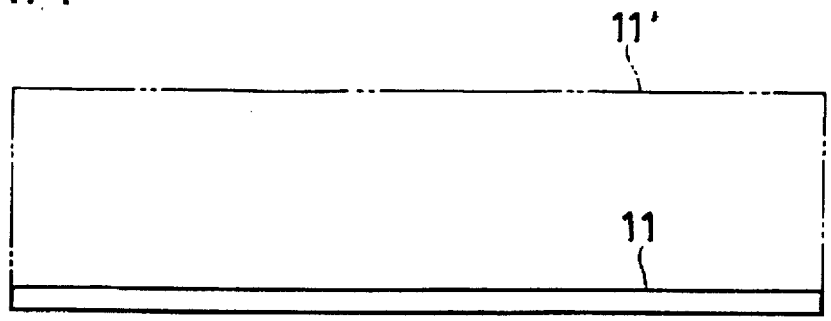
FIG. 1A is a side view showing a method of forming a sheet which constitutes a main part of a material for relief according to the present invention.
Figure 1B:
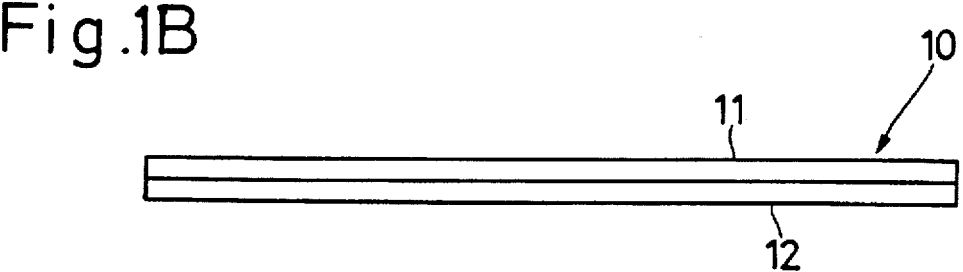
FIG. 1B is a side view showing the material for relief which is accomplished by attaching a hard paper sheet to the main sheet.

The present invention will be described with reference to the accompanying drawings. First, the most basic material for relief and a method for forming relief will be described with reference to FIGS. 1A through 1D. As shown in FIG. 1A, a cellulose sponge 11' (indicated by an imaginary line), which is chiefly made of highly-pure pulp material of wood, is formed into a thin sheet 11 by heating and compressing. As shown in FIG. 1B, a paper base 12, which is harder than the sheet 11, is attached to the back side of the sheet 11 using an adhesive agent. In this way, a relief material 10 is accomplished.

Figure 1C:
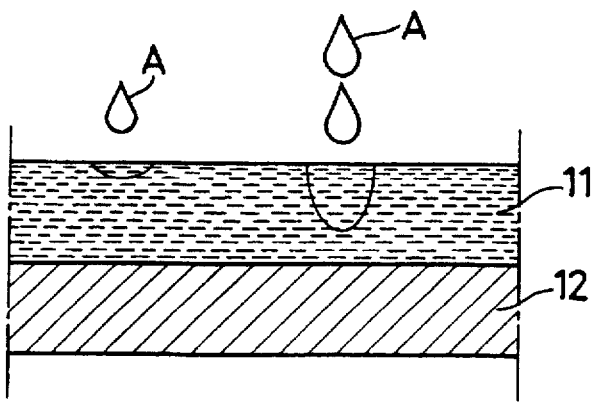
FIG. 1C is an enlarged cross-sectional view showing a state in that water is applied to a top-surface of the relief material.
Figure 1D:
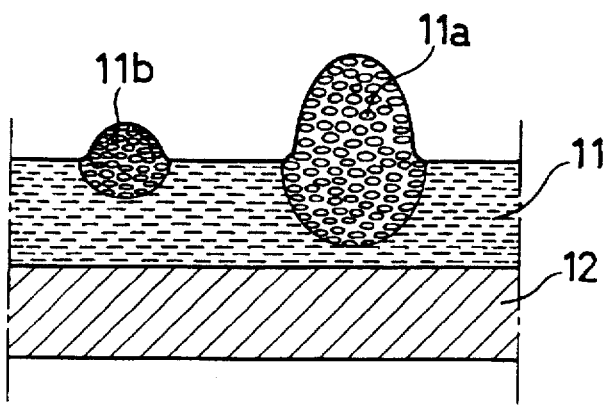
FIG. 1D is an enlarged cross-sectional view showing a state in that raised-portions are formed on the relief material by applying the water.

The user forms relief using the above material 10. Specifically, a pattern such as a picture and a character (not shown) is drawn on the top-surface of the material 10 using oil ink, color pencil, Or the like. Then, as shown in FIG. 1C, water A is supplied to the top-surface of the sheet 11 in such a manner as to correspond to the pattern. As a result, that area of the top-surface of the sheet 11 which is supplied with the water is swollen to form raised-portions 11a and 11b as shown in FIG. 1D. The raised-portions 11a and 11b become higher as an amount of the supply of water A is increased. The area supplied with water has a relatively high water-retentive capacity unless it becomes saturated and the supplied water is hardly oozed into its surrounding area. Therefore, the user can adjust the height freely.

The raised-portions 11a and 11b are soft when they contain water. By drying either naturally or with the use of a dryer, the raised-portions 11a and 11b are increased in hardness and capable of maintaining their configurations. The raised-portions 11a, 11b can be corrected in configuration by pressing with a finger after the raised-portions 11a, 11b have been dried. Although the raised-portions 11a and 11b have elastic properties, they are not completely restored to their original configurations by removal of the pressing force.

In the sheet 11, that area which is supplied with water tends to spread two-dimensionally in a direction parallel with the plane of the sheet 11. If this spreading should be allowed, the sheet 11 would be corrugated. The base 12 on the back side of the sheet 11 is adapted to prevent the corrugation of the sheet 11 by prohibiting the two-dimensional spreading of the sheet 11. This base 12 also has the roles for reinforcing the sheet 11 and preventing the sheet 11 from swelling toward the back side thereof when the sheet 11 is in a water-contained soft state.

For forming the relief according to the present invention, the user may purchase the sheet 11 of FIG. 1A and attach the base 12 to the back-surface of the sheet 11 in order to make the material 10 of FIG. 1B. The user may also purchase the material 10 comprising the sheet 11 and the base 12 for the same purpose. The user may draw the pattern by himself/ herself in the manner as mentioned above. The user may also purchase the material 10 with a pattern already drawn thereon and form the relief simply by supplying water and then drying.

Figure 2:
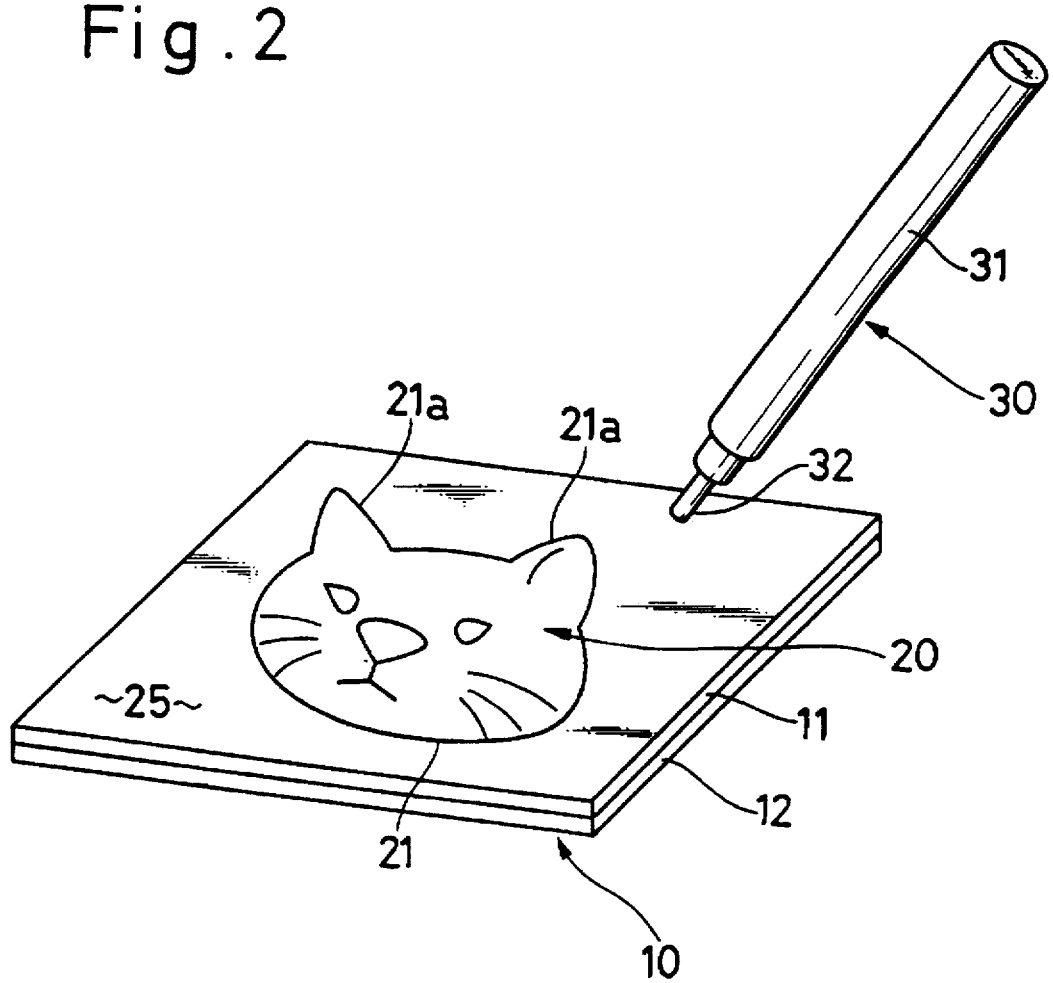
FIG. 2 is a perspective view showing the material for relief more concretely.

A more concrete example will be described with reference to FIG. 2. On the top-surface of the material 10 comprising the sheet 11 and base 12, the user draws a picture, for example, of a cat face 20 as a pattern. Then, the user supplies water to the patterned-area using a brush or felt pen 30. The water is contained in a hollow body 31 of the felt pen 30 and brought to a tip 32 made of felt, by capillary action. The user holds the felt pen 30 with one hand and supplies the water to the cat face 20 through the tip 32 contacting the cat face 20. As a result, the cat face 20 is swollen to accomplish the relief. At that time, since no water is supplied to a flat area 25 outside the cat face 20, the flatness of the area 25 is maintained as it is. By gradually increase the supplying amount of water from a contour 21 (excluding the contours of the ears) of the cat face 20 toward a central part including the nose, that area in the vicinity of an inner side of the contour 21 is swollen slightly and the central part of the cat face 20 is swollen greatly, thus forming a curve as a whole. By supplying an increased amount of water to the ears, the ears are raised high. At that time, by cutting in the sheet 11 along the contours 21a of the ears with a cutter knife, the ears can be raised high in a manner discontinuous from the area 25. By supplying no water or only a reduced amount of water to the area of eyes, the eyes are depressed from the rest area. In this way, a real-looking relief is accomplished. It should be noted that in order to prevent water from permeating into the area outside the contour 21 so that no swelling will occur there, a waterproof agent such as wax or adhesive agent may be preliminarily impregnated to the area in the vicinity of the contour 21. Similar waterproof agent may also be impregnated to the area of the eyes.

Figure 3:
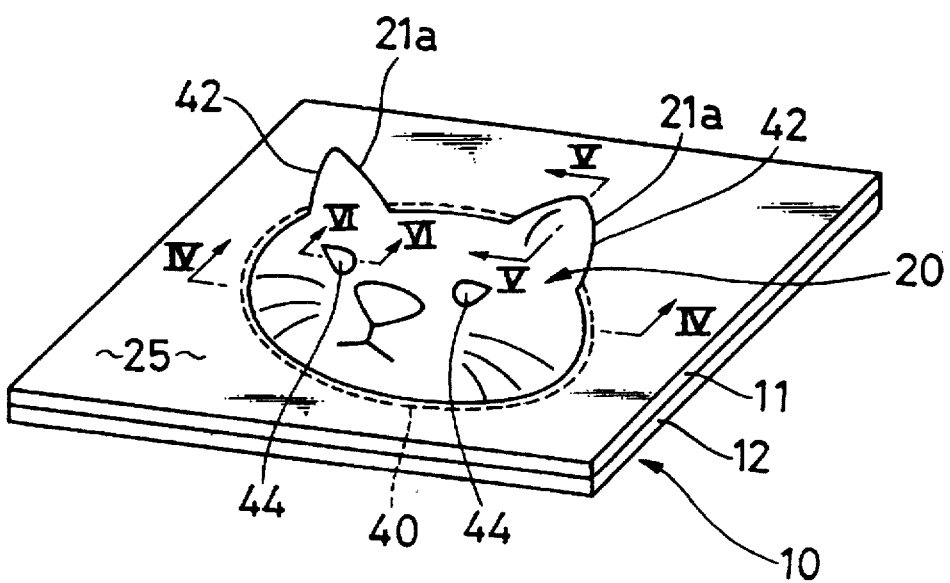
FIG. 3 is a perspective view of an improved material for relief.
Figure 4:
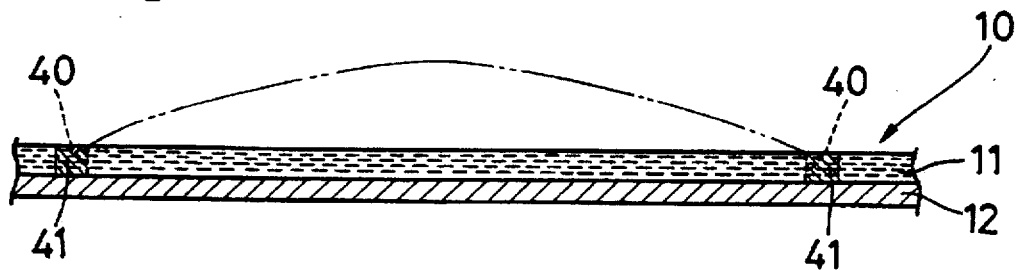
FIG. 4 is an enlarged cross-sectional view taken on line IV—IV of FIG. 3.
Figure 5:
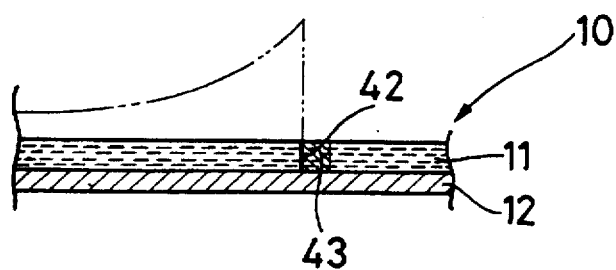
FIG. 5 is an enlarged cross-sectional view taken on line V—V of FIG. 3.
Figure 6:
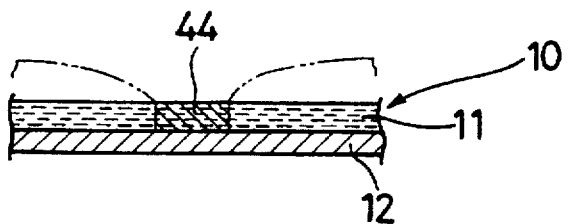
FIG. 6 is an enlarged cross-sectional view taken on line VI—VI of FIG. 3.

FIGS. 3 to 6 show a material 10 with which the user can form relief in a simple manner. Like component parts of FIG. 2 are denoted by like numerals, and description thereof is omitted. As shown in FIG. 3, on the top-surface of the material 10, a cat face 20 is preliminarily printed in color. As shown in FIGS. 3 and 4, the sheet 11 are sewn with a thread 40 along the contour 21 (excluding the contours of the ears) of the cat face 20. At an area in the vicinity and an outward position of the contour 21, a waterproof portion 41 constructed by impregnating a wax or by impregnating and hardening an adhesive agent is formed. As shown in FIGS. 3 and 5, a cut 42 is formed in the contours 21a of the ears. At the area in the vicinity and an outward position of the cut 42, a waterproof portion 43 constructed by impregnating a wax or adhesive agent is formed along the cut 42. It should be noted that instead of the waterproof portion 43, the area in the vicinity and an outward position of the cut 42 may be sewn with a thread. Furthermore, as shown in FIGS. 3 and 6, a waterproof portion 43 impregnated with a wax or adhesive agent is formed on the sheet 11 at an area corresponding to the eyes.

In case of the use of the material 10 of FIGS. 3 to 6, the user adjusts the height of the rising of the cat face 20 as shown by an imaginary line of FIG. 4 by appropriately adjusting the amount of the supply of water. At that time, since the contour 21 is sewn with the thread 40 and the waterproof portion 41 is formed at the area outside the contour 21, even if the user should supply the water to this area outside the contour 21 of the cat face 20 by mistake, this outside area would not be swollen. Also, since the cut 42 is formed in the contours 21a of the ears and the waterproof portion 43 is formed outside the contours 21a, when an increased amount of water is supplied to the inner areas of the contours 21a of the ears, the ear portions can be sharply raised in a manner discontinuous from the flat area outside the contours 21a as shown by an imaginary line of FIG. 5. The eye areas are not swollen because the waterproof portions 44 are formed there. Therefore, the eye areas (only one eye area is shown in FIG. 6) can be depressed compared with the raised portions therearound as shown by an imaginary line of FIG. 6.

Figure 7:
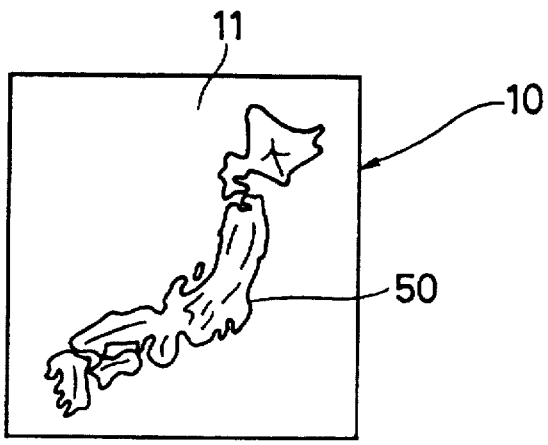
FIG. 7 is a perspective view showing a material for relief, which has a different pattern.

As shown in FIG. 7, in case a map 50 is drawn, as a pattern, on the top-surface of the sheet 11, several colors are preliminarily applied to the map depending on the altitude. By supplying water in accordance with the colors, the user can make a relief of a real-looking map.

Figure 8:
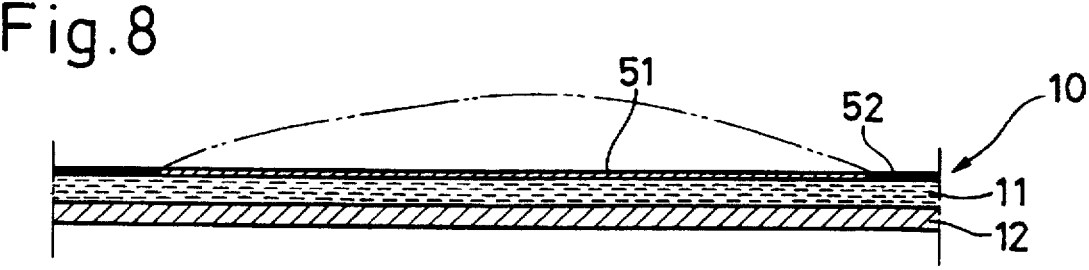
FIGS. 8 to 12 are enlarged cross-sectional views showing modified embodiments of the material for relief, respectively.
Figure 9:
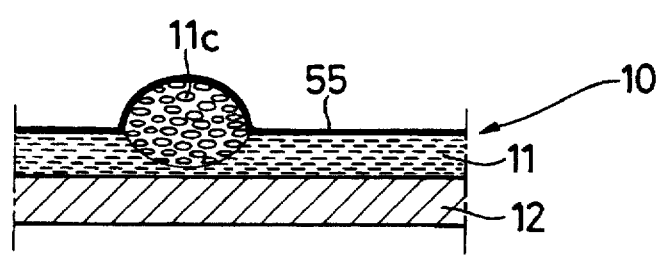

In the embodiments shown respectively in FIGS. 8 and 9, since the basic constructions are the same as the above embodiment, like component parts are denoted by like numerals and description thereof is omitted. In the embodiment of FIG. 8, at an expected-swelling area of the top-surface of the sheet 11, a water-permeable top-layer 51, which is made of a non-woven fabric such as a cotton fiber, or a felt material, is formed, and a water-impermeable top-layer 52 is formed on the whole remaining area. Since the top-layer 51 can conceal a rough surface of the raised portion of the sheet 11, a unique outer appearance and feel can be obtained. The top-layer 52 functions as a masking layer and prevents the permeation of water into the area covered with the top-layer 52. A pattern can be beautifully printed on the top-layer 51. It is preferred that the top-layer 52 is also made of a pattern-printable material. The top-layer 51 may be formed on the top-surface of the sheet 11 over the entire area thereof.

In the embodiment of FIG. 9, a water-permeable and expansible top-layer 55 made of a perforated rubber or the like is formed on the top-surface of the sheet 11. This top-layer 55 covers the entire area of the top-surface of the sheet 11, including an expected-swelling area and an expected-nonswelling area. When a water is supplied to the expected-swelling area of the sheet 11 through the top-layer 55, this area is turned out to be a raised-portion 11c. Since the top-layer 55 has expansible properties, it can cover the raised-portion 11c with the result that the surface of the raised-portion 11c looks smoothly. A pattern may also be preliminarily printed on this top-layer 55.

Figure 10:
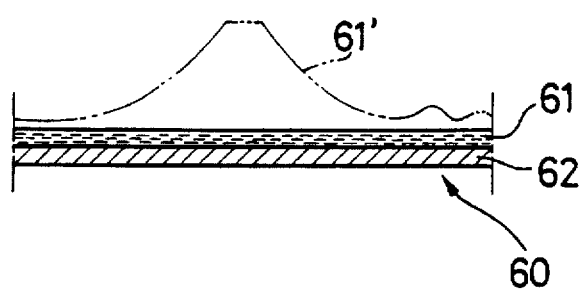

In the embodiment of FIG. 10, a cellulose sponge 61' having a relief (for example, mountain) is preliminarily formed using a mold. Then, the cellulose sponge 61' is heated and compressed into a sheet 61 having a predetermined thickness. A material 60 is formed by attaching a paper base 62, which is harder than the sheet 61, to the back-surface of the sheet 61. In this embodiment, the sheet 61 is high in density of cellulose at the area which is formed high in a sponge-like state, and low in density of cellulose at the area which is formed low. In this embodiment, by generally uniformly supplying a water to the top-surface of the sheet 11, the sponge 61' can be restored to its exact or approximately exact original configuration.

Figure 11:
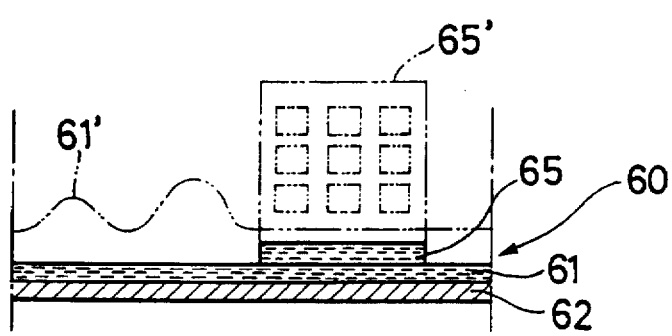

In the embodiment of FIG. 11, since the basic construction is generally the same as the embodiment of FIG. 10, like parts are denoted by like numerals and description thereof is omitted. In this embodiment, a member 65, which is obtained by heating and compressing another cellulose sponge 65' (for example, a sponge having a building configuration and its figure as illustrated), is attached to the sheet 61 by an adhesive agent. In this embodiment, by supplying a water not only to the sheet 61 but also to the member 65, a relief having a configuration resembling to the one as shown by imaginary lines can be accomplished.

Figure 12:
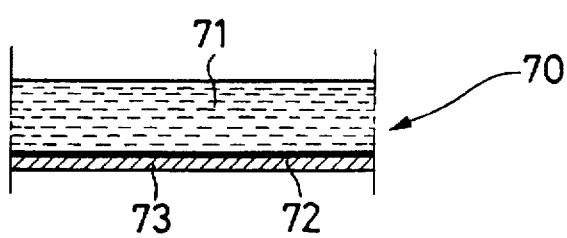

A relief material 70 as shown in FIG. 12 includes a sheet 71 obtained by heating and compressing a cellulose sponge, an adhesive layer 72 provided on an entire area of its back-surface, and a thin cover 73 adapted to cover this adhesive layer 72. In case this material 70 is used, it is preferable for the user to peel off the cover sheet 73 and attaching the sheet 71 to a harder base before or after the relief is formed.

In all the embodiments excluding that of FIG. 9, it is possible that starch, glue, resin, adhesive, or paint is impregnated or coated on the top-surfaces of the sheets 11, 61 and 71 as a finishing, so that the surface of the relief is smoothed and the configuration of the relief is stabilized. In the case of starch, it may be preliminarily impregnated in the sheet. The reason is that since the glue is water-soluble, it does not interfere the swelling of the sheet.

Examples of the bases attached to the back-surfaces of the sheets 11, 61 and 71 include plates made of plastic, wood, glass, and the like. The base can be totally eliminated.

The sheets 11, 61 and 71 may take any other configurations corresponding the patterns, than a square.

What is claimed is:

1. A material for forming a relief comprising:

a sheet obtained by heating and compressing a sponge made of cellulose, said sheet being expansible at a selected area by water applied thereto; and a base attached to a back surface of said sheet, said base being not expansible by an application of water, wherein a cut line is provided in said sheet along at least a part of a contour of said selected area, said cut line extending through the thickness of said sheet such that an application of water on one side of the cut line causes the sheet to expand on said one side in a discontinuous manner relative to a portion of the sheet on the other side of the cut line.

2. A relief comprising:

a sheet obtained by heating and compressing a sponge made of cellulose, said sheet being expanded at a selected area by water applied thereto; and a base attached to a back surface of said sheet, said base being not expansible by an application of water, wherein a cut line is provided in said sheet along at least a part of a contour of said selected area, said cut line extending through the thickness of said sheet such that an application of water on one side of the cut line causes the sheet to expand on said one side in a discontinuous manner relative to a portion of the sheet on the other side of the cut line.

3. A material according to claim 1, wherein a waterproof agent is impregnated in a part of said sheet, said part being adjacent to said selected area.

4. A material according to claim 3, wherein a pattern is provided on a top surface of said selected area of said sheet, and said waterproof agent is impregnated adjacent a contour of said pattern.

5. A material for forming a relief comprising:

a sheet obtained by heating and compressing a sponge made of cellulose, said sheet being expansible at a selected area by water applied thereto;

an adhesive layer being formed on a back-surface of said sheet; and a cover adapted to cover said adhesive layer being removably attached to said adhesive layer.

6. A material for forming a relief comprising a sheet obtained by heating and compressing a sponge made of cellulose, said sheet being expansible at a selected area by water applied thereto, wherein a pattern is provided on a top-surface of said selected area of said sheet, and said sheet is sewn along at least a part of a contour of said selected area.

7. A material according to claim 1, wherein said base is rigid such that the sheet is prevented from expanding toward said back surface.

8. A material according to claim 7, wherein said base is made of a material selected from the group consisting of paper, plastic, wood, and glass.

9. A relief according to claim 2, wherein a waterproof agent is impregnated in a part of said sheet, said part being adjacent to said selected area.

10. A relief according to claim 9, wherein a pattern is provided on a top surface of said selected area of said sheet, and said waterproof agent is impregnated adjacent a contour of said pattern.

11. A relief according to claim 2, wherein said base is rigid such that the sheet is prevented from expanding toward said back surface.

12. A relief according to claim 11, wherein said base is made of a material selected from the group consisting of paper, plastic, wood, and glass.

13. A relief comprising:

a sheet obtained by heating and compressing a sponge made of cellulose, said sheet being expanded at a selected area by water applied thereto;

an adhesive layer being formed on a back-surface of said sheet; and a cover adapted to cover said adhesive layer being removably attached to said adhesive layer.

14. A relief comprising:

a sheet obtained by heating and compressing a sponge made of cellulose, said sheet being expanded at a selected area by water applied thereto, wherein a pattern is provided on a top-surface of said selected area of said sheet, and said sheet is sewn along at least a part of a contour of said selected area.

15. A relief according to claim 6, wherein said sheet is cut in along at least a part of the contour of said selected area.

16. A relief according to claim 14 wherein said sheet is cut in along at least a part of the contour of said selected area.

* * * * *